US006738193B2

(12) United States Patent
Ouchi

(10) Patent No.: US 6,738,193 B2
(45) Date of Patent: May 18, 2004

(54) STEREOMICROSCOPE AND TRANSMISSION ILLUMINATION APPARATUS

(75) Inventor: Yumiko Ouchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 68 days.

(21) Appl. No.: 09/748,196

(22) Filed: Dec. 27, 2000

(65) Prior Publication Data
US 2001/0005280 A1 Jun. 28, 2001

(30) Foreign Application Priority Data
Dec. 28, 1999 (JP) .......................................... 11-374448

(51) Int. Cl.[7] .............................................. G02B 21/06
(52) U.S. Cl. ....................................... 359/388; 359/738
(58) Field of Search ................................. 359/385, 387, 359/388, 380, 381, 390, 368, 229, 736, 738

(56) References Cited
U.S. PATENT DOCUMENTS
6,396,628 B1 * 5/2002 Osa et al. .................... 359/385

FOREIGN PATENT DOCUMENTS
JP          41-5808 U      3/1941
WO          WO99/12068     3/1999

* cited by examiner

Primary Examiner—Drew Dunn
Assistant Examiner—Lee Fineman
(74) Attorney, Agent, or Firm—Morgan, Lewis & Bockius LLP

(57) ABSTRACT

A stereomicroscope is capable of interchangeably fitting low- and high-magnification objective lenses. A transmission illumination unit thereof includes a light source, a shield element for cutting off partially light beam, first and second condenser lenses for converging the light beam passing the shield element, and a mechanism for selecting one of the first and second condenser lens and disposing the selected lens on the optical axis. The first condenser lens sets a position conjugate to an entrance pupil of the low-magnification objective lens in a position of the shield element. The second condenser lens sets a position conjugate to an entrance pupil of the high-magnification objective lens in the position of the shield element.

9 Claims, 7 Drawing Sheets

STEREOMICROSCOPE AND TRANSMISSION ILLUMINATION APPARATUS

BACKGROUND OF THE INVENTION

1. Field of the Invention

The present invention relates generally to a stereomicroscope having a transmission illumination apparatus, and more particularly to a stereomicroscope capable of interchangeably fitting a high magnification objective lens and a low-magnification objective lens as an objective lens.

2. Related Background Art

What is known as a conventional transmission illumination apparatus of a stereomicroscope is an apparatus disclosed in Japanese Utility Model Post-Exam Publication No. 41-5808. This transmission illumination apparatus is, as shown in FIG. 10 constructed such that divergent beam of light emitted from a light source 101 are collimated by a collector lens 102 into the light beam substantially parallel to an optical axis 108, and the collimated light beam is given a diffusion by a diffusion plate 103. A light path of the light beam is deflected upwards by a mirror 104 and converged by a condenser lens 105 so that the light beam may impinge upon a specimen 106 and illuminate the specimen 106. At this time, the diffusion plate 103 serves as a secondary light source to illuminate a pupil of the objective lens with the light beam. Further, a knife edge 107 is slidably disposed in the vicinity of the diffusion plate 103. Hence, the pupil of the objective lens is partially shielded from the light by sliding the knife edge, whereby the specimen 106 undergoes an oblique illumination. Even when the specimen 106 is a phase object, a ratio of diffracted light to the transmitted light can be thereby increased, and the specimen can be observed with a high contrast. Further, the light is not allowed to enter directly the objective lens by increasing a degree of shielding, thereby making it feasible to attain a dark field illumination with which only the light diffracted or scattered by the specimen 106 is observed.

Moreover, another conventional transmission illumination apparatus is disclosed in Japanese Patent Application Laid-Open Publication No. 11-133308. In this transmission illumination apparatus, as shown in FIG. 11, the light beam from a light source 111 is collimated by a collector lens 112 into substantially parallel light beam, and a first diffusion plate 113 diffuses the light beam. The light beam is converged by a converging member 114 and, after being diffused by a second diffusion plate 115, is deflected upwards by a deflection mirror 116. The light beam from the deflection mirror 116 is converged by a second converging member 117 and impinges upon a specimen 118, thus illuminating the specimen 118. Light shield members 121c, 121d for an oblique illumination are disposed between the second diffusion plate 115 and the deflection mirror 116. Further, when the objective lens is switched over from a low-magnification lens to a high-magnification lens, a conjugate position of a pupil of the objective lens deviates, and hence the light shield members 121c, 121d are removed, and light shield members 121a, 121b are inserted. Moreover, auxiliary lenses 119, 120 for intensifying the light convergence are also inserted for a high-magnification objective lens having a larger numerical aperture.

An application and a using purpose of the stereomicroscope have been diversified such as being used for inspection in a parts shop etc and for an embryo manipulation of a living body in a gene laboratory etc, and hence a variety of performances have been demanded of the stereomicroscope. A trend over the recent years has, however, been that a stereomicroscope capable of interchangeably fitting a plurality of objective lenses for broadening a magnification range and of having a wide visual field and a high resolution.

If trying to broadening an illumination range for securing a wide visual field in the conventional transmission illumination apparatus disclosed in Japanese Utility Model Post-Exam Publication No. 41-5808, it is required that a degree of diffusion of the diffusion plate 103 be increased. If the degree of diffusion is increased, however, a light intensity per unit area is reduced, and therefore the illumination darkens. Further, if a diameter of the pupil is increased for conducting an illumination corresponding to a numerical aperture of the objective lens having the high resolution in order to actualize the high resolution, there is no alternative but to scale up the diffusion plate 103, resulting in an increase in thickness or size of the illumination apparatus. Consequently, the stereomicroscope for the manipulation comes to have a poor usability.

Further, the transmission illumination apparatus disclosed in Japanese Patent Application Laid-Open Publication No. 11-133308 is, though capable of interchangeably fitting the high- and low magnification objective lenses, required to remove and insert the light shield members disposed in two positions with respect to the optical axis, corresponding to a deviation in conjugate position of the pupil of the objective lens depending on which lens, the high-magnification objective lens or the low-magnification objective lens, is used. Another requirement is that the auxiliary lenses as many as two units be simultaneously inserted. Therefore, the number of components increases, and the apparatus becomes complicated, resulting in an increase in cost.

SUMMARY OF THE INVENTION

It is primary object of the present invention to provide a stereomicroscope capable of observing an object by a stable oblique illumination with a simple configuration in a broad magnification range from a high magnification down to a low magnification.

According to one aspect of the present invention, a stereomicroscope comprises an illumination unit for illuminating a specimen with light, a specimen setting board, and a fitting member for fitting an objective lens. The illumination unit, the specimen setting board and the fitting member are disposed in sequence on an optical axis. One of a predetermined a low-magnification objective lens and a higher-magnification objective lens than the low-magnification objective lens can be selected and fitted as the objective lens to the fitting member. The illumination unit includes a light source, a shield element for cutting off partially light beam emitted from the light source, first and second condenser lenses for converging the light beam passing the shield element on the specimen, and a mechanism for selecting one of the first and second condenser lenses and disposing the selected lens on the optical axis. The first condenser lens has an optical characteristic of setting a position conjugate to an entrance pupil of the low-magnification objective lens fitted to the fitting member in a position of the shield element or in the vicinity of the shield element, and the second condenser lens has an optical characteristic of setting a position conjugate to an entrance pupil of the high-magnification objective lens fitted to the fitting member in a position of the shield element or in the vicinity of the shield element.

DESCRIPTION OF THE PREFERRED EMBODIMENTS

Embodiments of the present invention will hereinafter be described with reference to the accompanying drawings.

(First Embodiment)

A stereomicroscope of a first embodiment of the present invention will be explained.

Figure 9:
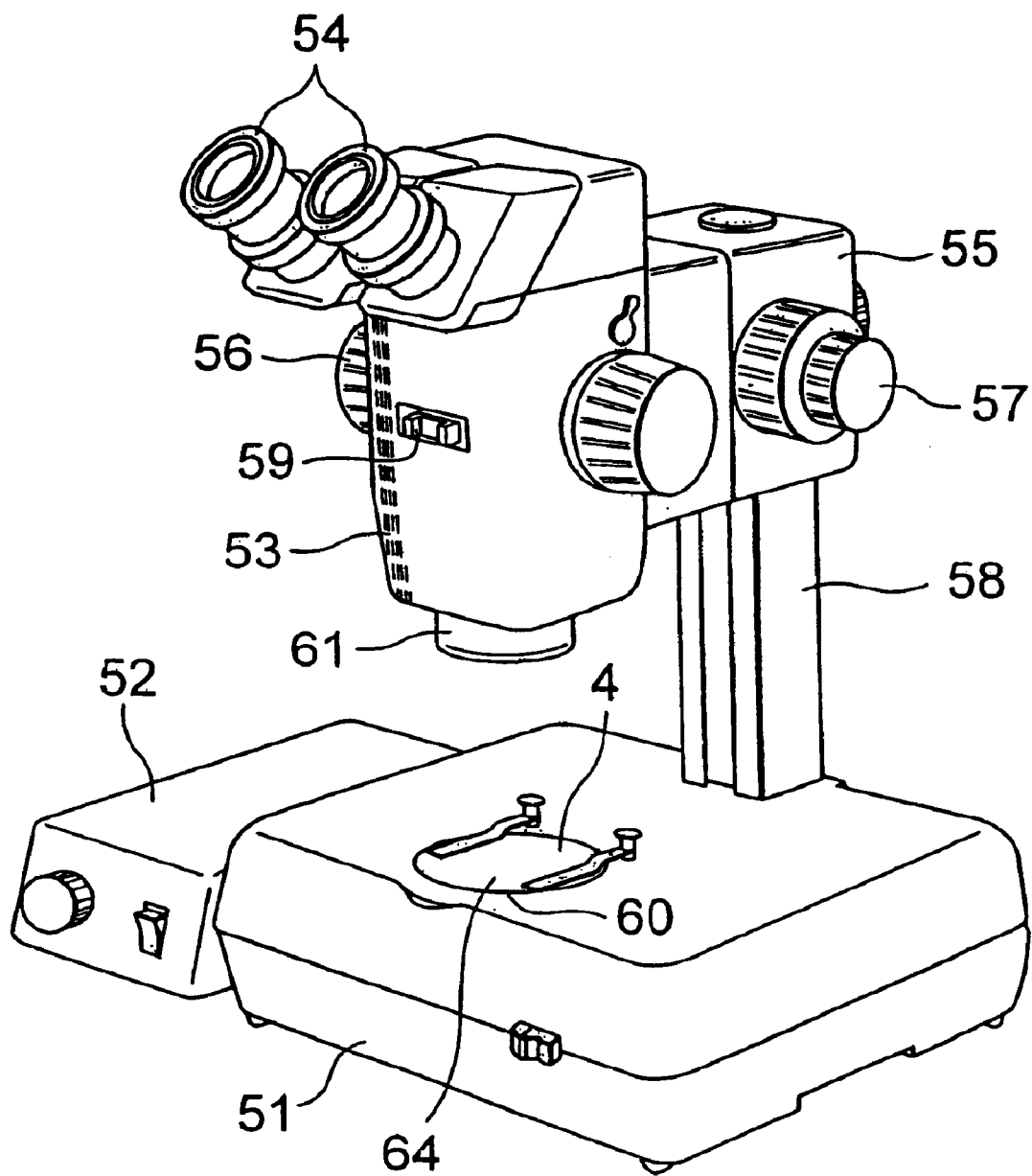
FIG. 9 is a perspective view showing a whole configuration of the stereomicroscope in the first embodiment of the present invention.
Figure 10:
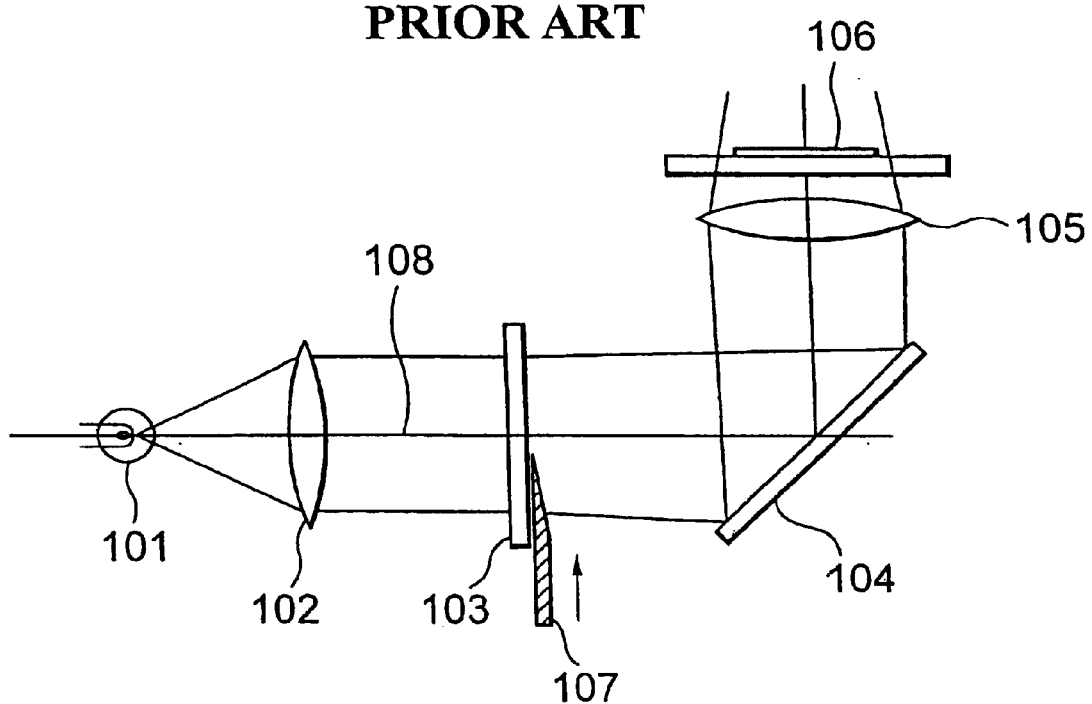
FIG. 10 is a block diagram showing a configuration of a conventional transmission illumination apparatus for a stereomicroscope.
Figure 11:
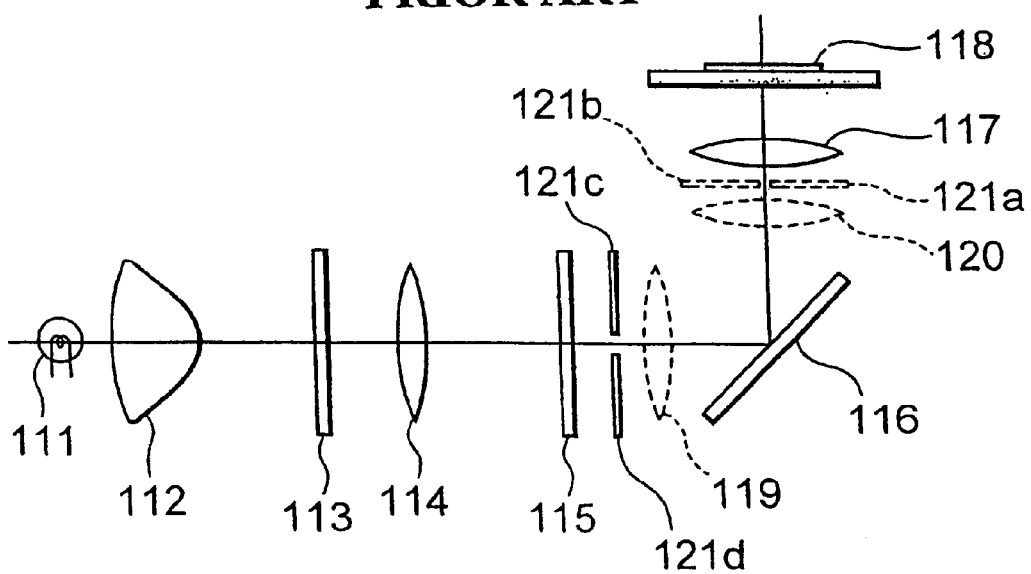
FIG. 11 is a block diagram showing a configuration of a conventional transmission illumination apparatus for a stereomicroscope.

The stereomicroscope of the first embodiment is classified as a Galileo type object stereomicroscope and, as shown in FIG. 9, includes a base 51 having a built-in transmission illumination apparatus, an objective lens 61, a zoom lens barrel 53, eyepieces 54 and a focusing device 55. A specimen setting board 60 inset with a transparent member 64 is provided on an upper surface of the base 51.

The objective lens 61 is fitted to an objective lens fitting member (not shown) provided at a lower portion of the zoom lens barrel 53. One of a plurality of predetermined low-magnification objective lenses and a plurality of predetermined high-magnification objective lenses, is selected and may be fitted as the objective lens 61. Herein, the high-magnification objective lens is a lens of which an angle made by right and left optical axes is equal to or larger than 20°. The low-magnification objective lens is a lens of which an angle made by the right and left optical axes is less than 20°.

Zoom lens units (not shown) respectively for a left eye and for a right eye and an image forming lens unit (unillustrated), are disposed inside the zoom lens barrel 53. A zooming knob 56 is provided outside the lens barrel. The zoom lens unit includes a movable lens for zooming, and this zoom movable lens is so constructed as to move in a direction of the optical axis with rotation of the zooming knob 56. Further, the zoom lens unit contains a variable stop, and the zoom lens barrel 53 is fitted with a slider switch 59 for adjusting this variable stop.

The focusing device 55 has a focusing knob 57 and a mechanism (unillustrated) for vertically moving the zoom lens barrel 53 along a shaft 58 with rotation of the knob 57. The objective lens 61 and the eyepieces 54 are moved vertically integrally with the zoom lens barrel 53.

Figure 1:
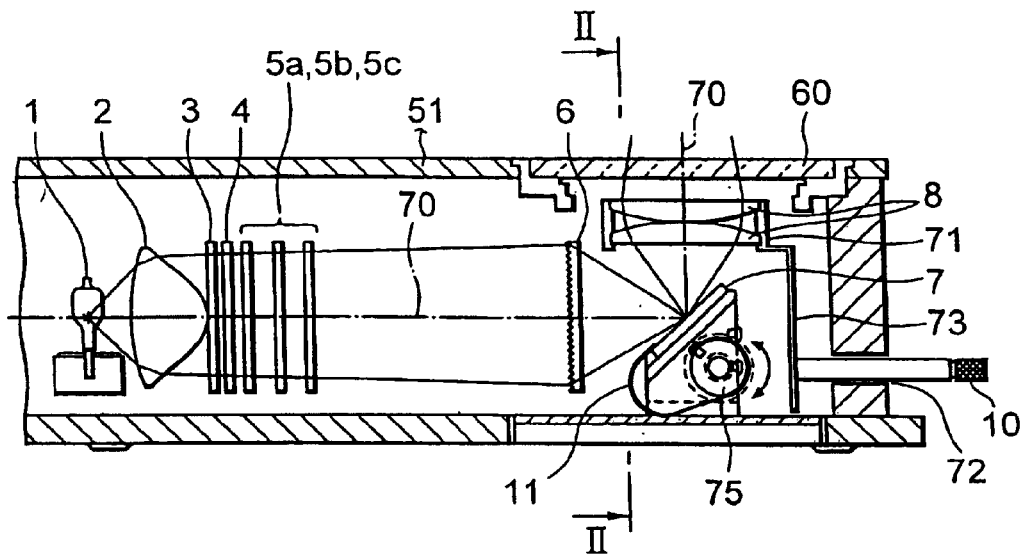
FIG. 1 is a sectional view showing a configuration of a transmission illumination apparatus within a base 51 of a stereomicroscope in a first embodiment of the present invention.
Figure 2:
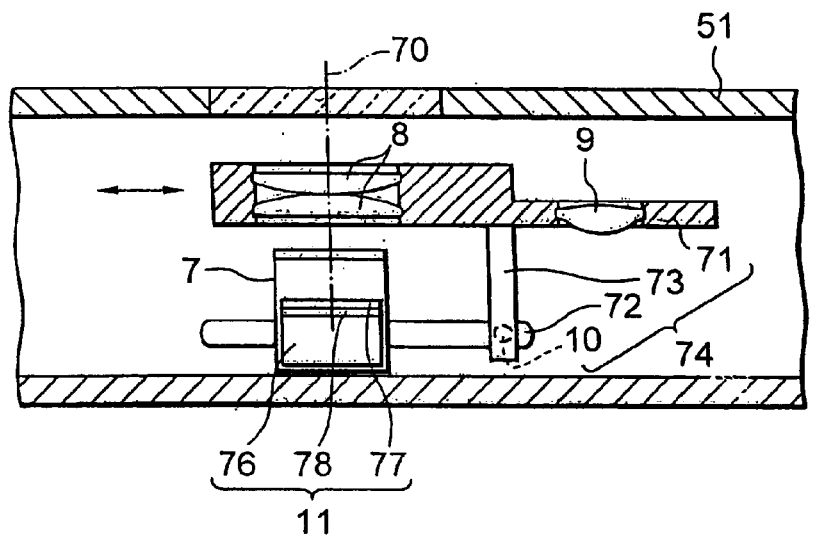
FIG. 2 is a sectional view, taken along the line II—II in FIG. 1, of the base 51.

The transmission illumination apparatus disposed inside the base 51 includes a light source 1, a collector lens 2, a diffusion plate 4, a field lens 6, a deflection mirror 7 and condenser lenses 8, 9, which are, as shown in FIGS. 1 and 2, disposed in sequence on an optical axis 70 of the objective lens 61. The condenser lenses 8, 9 are, as shown in FIG. 2, mounted in a slide mechanism 74 for selecting one of the condenser lenses 8, 9 and disposing it on the optical axis 70. The light source 1 is a halogen lamp, and the field lens 6 is a plastic Fresnel's lens having positive refracting power.

The slide mechanism 74 includes a lens frame 71 incorporating the condenser lenses 8, 9, a lever 10 fixed via a member 73 to the lens frame 71, and a slit 72 formed in a side surface of the base 51. Any one of the condenser lenses 8, 9 is chosen by sliding the lever 10 along the slit 72 and thus can be disposed on the optical axis 70.

Further, the deflection mirror 7 has a light shielding function for an oblique illumination. The light shielding function is actualized by a cover member 11 for covering a part of a reflecting surface of the deflection mirror 7, and by a take-up mechanism 75, disposed at a rear surface of the deflection mirror 7, for taking up the cover member 11. The take-up mechanism 75 is rotated by a user rotating an unillustrated dial, thereby taking up or feeding out the cover member 11. With this operation, the cover member 11 covers the upper surface of the deflection mirror 7, thus cutting off light beam to be incident on the deflection mirror 7. A portion of light beam to be reflected by the deflection mirror 7 is thereby cut off, and the oblique illumination can be attained. The cover member 11 adjusts a quantity with which the cover member 11 covers the deflection mirror 7, whereby a quantity of the beam to be cut off can be consecutively adjusted. Hence, an angle of the oblique illumination can be adjusted. If contrived not to allow the light to directly enter the objective lens 61 by increasing a light shielding degree, a dark field illumination may also be attained.

The cover member 11 takes such a structure that a nonwoven fabric 76 that does not reflect the light is stuck to an upper surface of a metallic plate thin enough to cause a flexure. Note that as a substitute for the nonwoven fabric 76, a reflection film 77 exhibiting a reflectance of 50% and a reflection film 78 with a reflectance of 30% are stuck in sequence from a front end side to an area having a predetermined width from the front end portion of the upper surface of the metal thin plate. With this configuration, the reflectance is gradually decreased such as 50%, 30% and 0% from the front end side at the front end portion of the cover member 11. Thus, a light shielding rate is set low at the front end portion of the light shield member and higher towards the inside of the light shield member, thereby making it possible to prevent a phenomenon in which glaring occurs on the end surface due to the diffracted light spreading inside at the edge of the specimen with a large difference in contrast when the oblique illumination takes place, and to obtain a sharp image of the specimen. Note that the light shield rate (reflectance) is not necessarily set at the three stages as described above, and the above effect can be obtained by decreasing the reflectance at least two stages. Further, there may also be taken such a construction as to consecutively gradually decrease the reflectance.

The light source 1, the collector lens 2, the diffusion plate 4 and the field lens 6 are disposed so that the image of the light source 1 is formed on the reflecting surface of the deflection mirror 7 incorporating the light shielding function. Herein, these components are disposed so that divergent rays from the light source 1 are collimated into substantially parallel light beam by the collector lens 2, the light beam is diffused by the diffusion plate 4, the field lens 6 converges the diffused beam, and the image of the light source 1 is formed on the deflection mirror 7. This layout yields an effect in which the bright illumination with no ununiformity is actualized in an observation of a bright field. Further, the mirror is disposed in the position where the beam is narrowed down, and hence there are produced such an effect that the mirror can be decreased in size and a thickness of the apparatus can be reduced.

An adiabatic or heat shield filter 3 is interposed between the collector lens 2 and the diffusion plate 4, thereby cutting the long-wave light unnecessary for the observation. Further, a variety of filters 5a, 5b, 5c for selecting a wavelength are disposed between the diffusion plate 4 and the field lens 6 as the necessity may arise.

Next, relations between a position of the deflection mirror incorporating the light shielding function, optical characteristics of the condenser lenses 8, 9 and an entrance pupil of the objective lens 61, will be explained.

It is desirable for attaining the uniform oblique illumination over the actual visual field that the light be cut off on the plane of the entrance pupil of the objective lens 61. It is therefore desirable that the reflecting surface of the deflection mirror 7 having the light shielding function be disposed in a position of the entrance pupil of the objective lens 61 or in a position conjugate to the entrance pupil. The entrance pupil of the objective lens 61 is, however, moved by so-called zooming, i.e., an operation of consecutively changing a magnification by moving the movable lens of the zoom lens unit. Besides, in the first embodiment, the objective lens 61 may involve the use of the low-magnification objective lens and the high-magnification objective lens that can be interchangeably used, and the position of the entrance pupil differs depending on the low-magnification objective lens and the high-magnification objective lens. Such being the case, in accordance with the first embodiment, the optical characteristics of the condenser lenses 8, 9 are designed as follows, whereby the position conjugate to the entrance pupil of the objective lens 61 can be set in the vicinity of the deflection mirror 7 having the light shielding function even when exchanging the objective lens 61 and performing the zooming.

Figure 4:
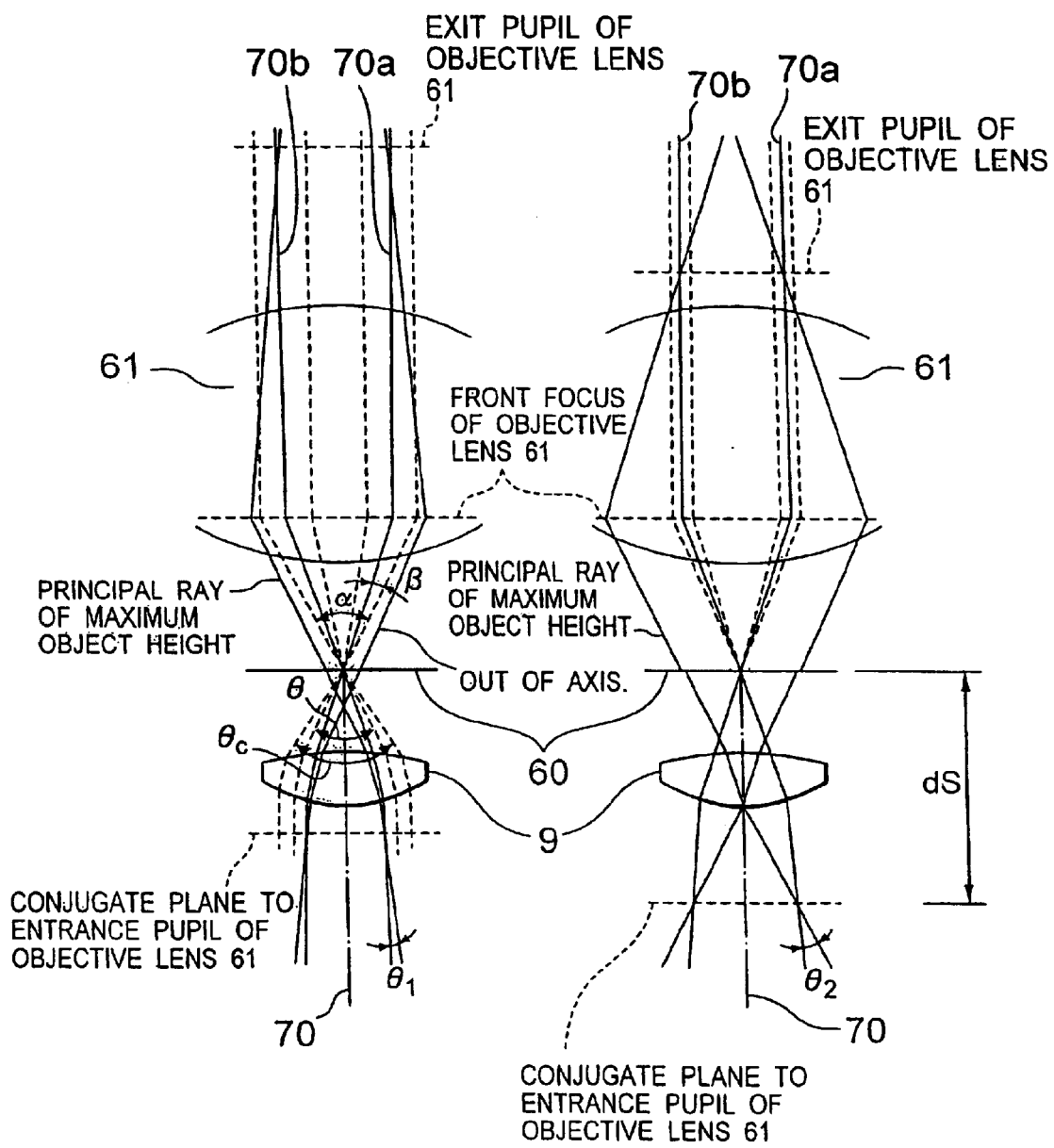
FIG. 4(A) is an explanatory view showing a light path when zooming of a zoom lens unit is set at the maximum magnification with a high-magnification objective lens being fitted as an objective lens 61 in the stereomicroscope in the first embodiment.
FIG. 4(B) is an explanatory view showing a light path when zooming of the zoom lens unit is set at the minimum magnification.
Figure 5:
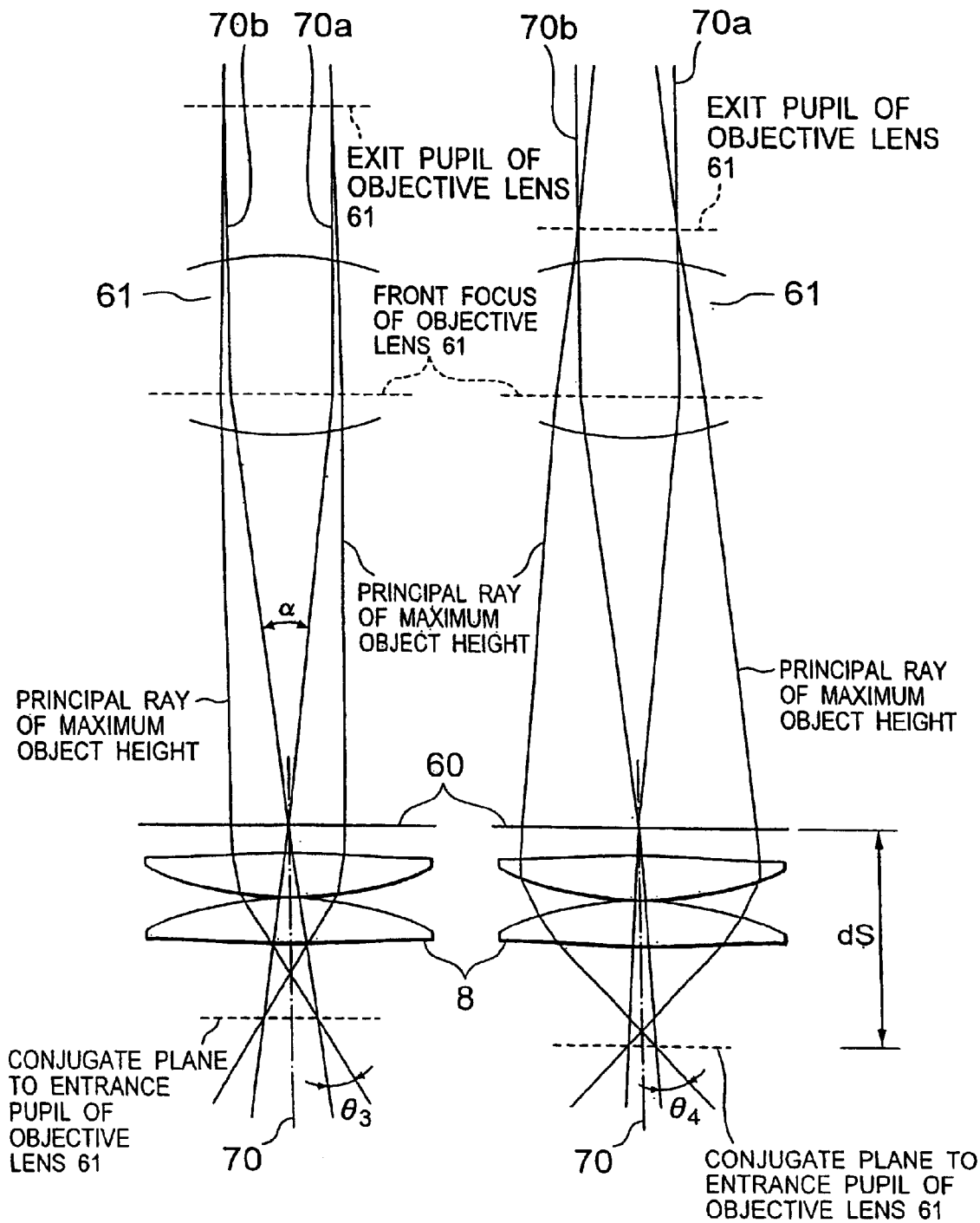
FIG. 5(A) is an explanatory view showing a light path when zooming of a zoom lens unit is set at the maximum magnification with a low-magnification objective lens being fitted as the objective lens 61 in the stereomicroscope in the first embodiment.
FIG. 5(B) is an explanatory view showing a light path when zooming of the zoom lens unit is set at the minimum magnification.
Figure 6:
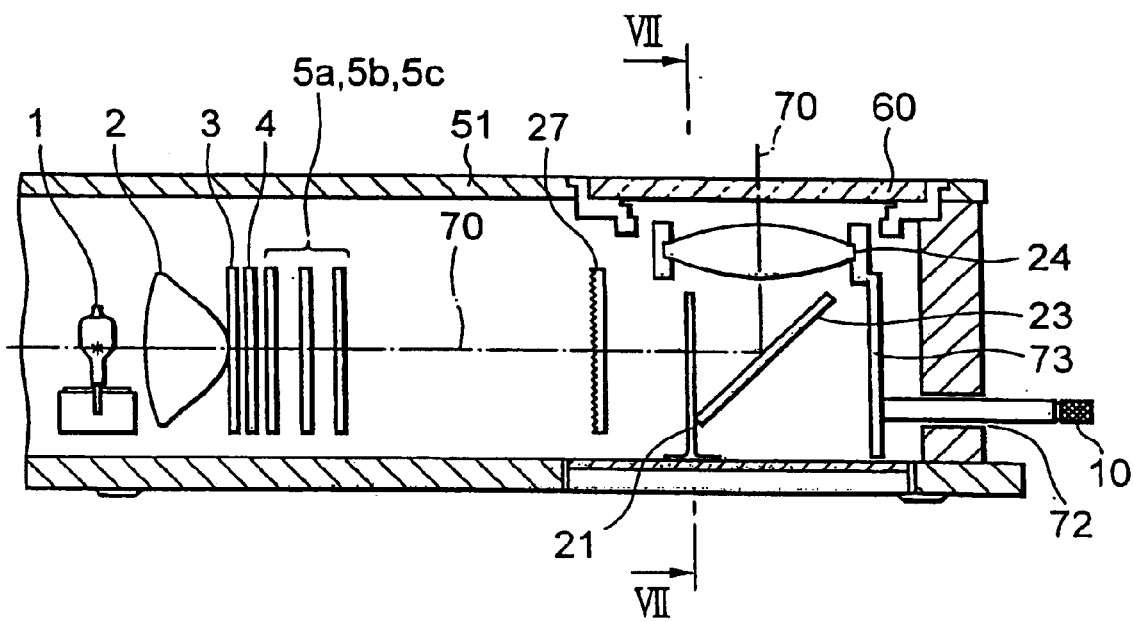
FIG. 6 is a sectional view showing a configuration of the transmission illumination apparatus within the base 51 of a stereomicroscope in a second embodiment of the present invention.
Figure 7:
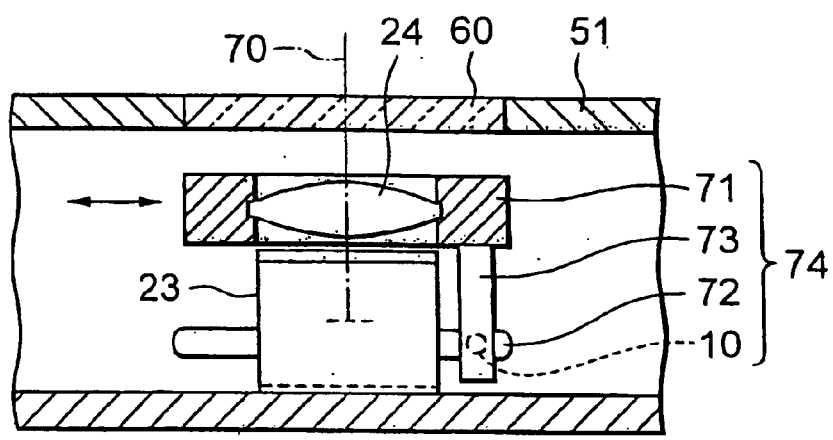
FIG. 7 is a sectional view, taken along the line VII—VII in FIG. 6, of the base 51.
Figure 8:
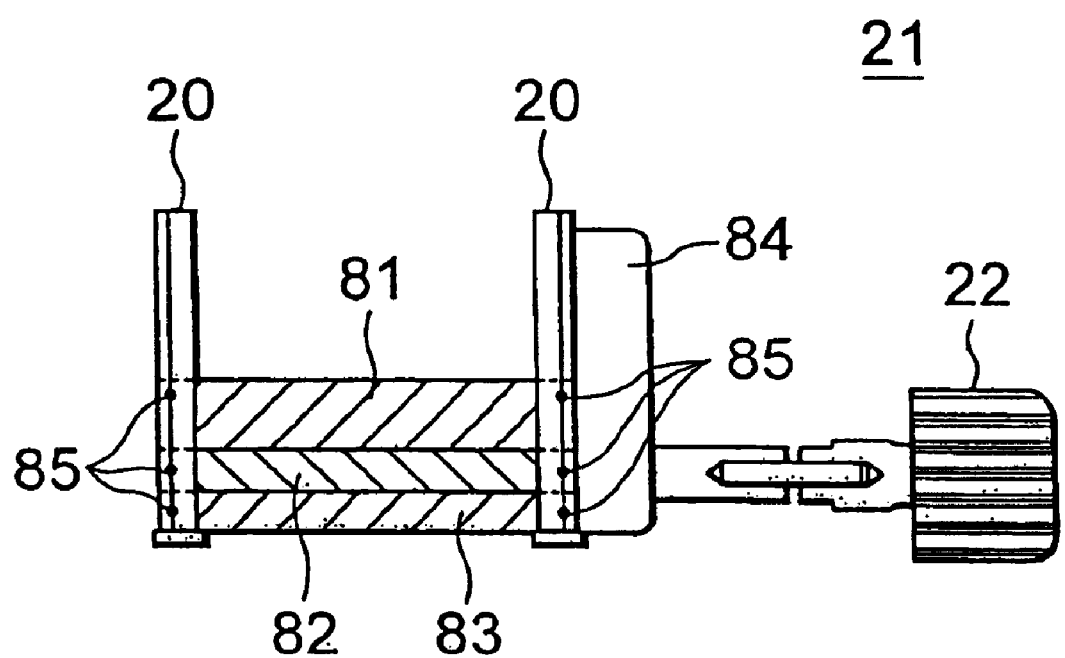
FIG. 8 is a front view showing a shield element 21 used in the illumination apparatus of the stereomicroscope in the second embodiment of the present invention.

Referring first to FIGS. 4(A) and 4(B), there are shown light paths when the high-magnification objective lens is fitted as the objective lens 61. FIG. 4(A) shows the light path when a zoom magnification of the zoom lens unit is set to the maximum. FIG. 4(B) shows the light path when the zoom magnification of the zoom lens unit is set to the minimum. Note that the condenser lens 9 for the high-magnification objective lens is disposed on the optical axis 70 in both cases in FIGS. 4(A) and 4(B). By contrast, FIGS. 5(A) and 5(B) show light paths when the low-magnification objective lens is fitted as the objective lens 61. FIG. 5(A) shows the light path when a zoom magnification of the zoom lens unit is set to the maximum. FIG. 5(B) shows the light path when the zoom magnification of the zoom lens unit is set to the minimum. Note that the condenser lens 8 for the low-magnification objective lens is disposed on the optical axis 70 in both cases in FIGS. 5(A) and 5(B). A characteristic of the single-objective stereomicroscope is that the optical axis posterior to the objective lens is separated into an optical axis 70a for a right eye and an optical axis 70b for an left eye, and the zoom lens units (not shown) are disposed with the optical axes 70a, 70b for the left and right eyes being set as their respective optical axes.

As can be understood by comparing positions of planes conjugate to the entrance pupil of the objective lens 61 in FIGS. 4(A) and 4(B), an exit pupil of the objective lens 61 and the plane conjugate to the entrance pupil change along the optical axis 70 as the zooming by the zoom lens unit varies from the high magnification to the low magnification. With respect to FIGS. 5(A) and 5(B), it can be understood that the exit pupil of the objective lens 61 and the plane conjugate to the entrance pupil similarly change along the optical axis 70 as the zooming by the zoom lens unit varies from the high magnification to the low magnification. Thus, the position of the pupil of the objective lens 61 moves as the zooming varies, and it is therefore difficult to make the position of the deflection mirror 7 fixedly disposed and the plane conjugate to the entrance pupil completely coincident with each other, however, this difficulty is obviated by the following method in the first embodiment.

Referring to FIGS. 4(A) and 4(B), when concentrating on the principal ray traveling through a maximum object height and the optical axis 70b, with respect to an angle made by the principal ray traveling through the plane conjugate to the entrance pupil of the objective lens 61 and by the optical axis 70b, an angle θ1 when the zooming is set at the high magnification in FIG. 4(A) is smaller than an angle θ2 when the zooming is set at the low magnification in FIG. 4(B). Hence, it can be comprehended that a focal depth on this plane is larger when the zooming is set at the high magnification in FIG. 4(A) than when the zooming is set at the low magnification in FIG. 4(B). Similarly when the objective lens 61 is the low-magnification objective lens, with respect to the angle made by the principal ray traveling through the entrance pupil of the objective lens 61 and by the optical axis 70b, an angle θ3 when the zooming is set at the high magnification in FIG. 5(A) is smaller than an angle θ4 when the zooming is set at the low magnification in FIG. 5(B). Namely, whether the objective lens 61 is the low-magnification objective lens or the high-magnification objective lens, the focal depth of the entrance pupil is larger when the zooming is set at the high magnification than when set at the low magnification. Hence, a positional deviation of the light shielding surface is allowable to some extent due to a large focal depth of the pupil when the zooming is set at the high magnification. Then, in accordance with the first embodiment, the deflection mirror 7 having the light shielding function is disposed in the position of the entrance pupil at the time when the zooming is set at the low magnification and at which position the focal depth of the entrance pupil is small, whereby the oblique illumination with less vignetting can be attained in a wide zoom area.

As discussed above, even when the deflection mirror 7 having the light shielding function is disposed in the position of the entrance pupil when the zooming is set at the low magnification, if the positional deviation of the entrance pupil when the zooming is set at the low magnification occurs between the high-magnification objective lens and the low-magnification objective lens, the position of the light shielding function must be shifted each time the objective lens is exchanged. Then, according to the first embodiment, the position of the plane conjugate to the entrance pupil of the objective lens at the time when the zooming is set at the high magnification is made coincident with the position of the plane conjugate to the entrance pupil of the objective lens at the time when the zooming is set to the low magnification by use of the condenser lenses 9, 8 having the optical characteristics that differ depending on the high-magnification objective lens and the low-magnification objective lens.

To be specific, the condenser lens 9 for the high-magnification objective lens and the condenser lens 8 for the low-magnification objective lens, are designed to satisfy the following condition:

$$0.5<(fH/dH)/(fL/dL)<6.0$$

where fL is a synthetic focal length of the condenser lens 8, fH is a synthetic focal length of the condenser lens 9, dL is a distance along the optical axis 70 from the center of the lens surface, closest to the deflection mirror 7, of the condenser lens 8 to the reflecting surface of the deflection mirror 7, and dH is a distance along the optical axis 70 from the center of the lens surface, closest to the deflection mirror 7, of the condenser lens 9 to the reflecting surface of the deflection mirror 7.

The reason why the condition is thus set is that if (fH/dH)/(fL/dL) is smaller than 0.5, the entrance pupil of the low-magnification objective lens can be set closer to the light source than the entrance pupil of the high-magnification objective lens. Further, (fH/dH)/(fL/dL) is larger than 6.0, reversely the entrance pupil of the low-magnification objective lens can be set closer to the specimen setting board 60 than the entrance pupil of the high-magnification objective lens. A more preferable condition is:

$$1.1<(fH/dH)/(fL/dL)<3.0$$

As described above, the optical characteristics of the condenser lenses 8, 9 are designed, and, when in observation, the slide mechanism is operated so that the condenser lens 8 is disposed on the optical axis 70 in the case of fitting the low-magnification lens as the objective lens 61 and the condenser lens 9 is disposed on the optical axis 70 in the case of fitting the high-magnification objective lens. With this operation, the position conjugate to the entrance pupil of the objective lens for the high magnification zooming and the position conjugate to the entrance pupil of the objective lens for the low magnification zooming may be coincident each other substantially. Hence, the reflecting surface of the deflection mirror 7 with the light shielding function is disposed in this position conjugate to the entrance pupil, whereby the position of the entrance pupil of the objective lens when the zooming is set at the low magnification can be substantially coincident with the light shielding position in both cases of using the high-magnification objective lens and the low-magnification objective lens. Further, the light shielding position exists within the focal depth of the entrance pupil of the objective lens when the zooming is set at the high magnification, and it is therefore possible to obtain the same effect as the position conjugate to the entrance pupil is coincident with the light shielding position.

When exchange of the objective lens 61 is effected between the high-magnification objective lens and with the low-magnification objective lens, and when the zoom lens unit is zoomed from the high magnification down to the low magnification, the position conjugate to the entrance pupil can be substantially coincided with the light shielding position, with the result that the oblique illumination can be done uniformly over the entire actual visual field.

Further, if the condenser lenses 8, 9 are spaced too much away from the specimen surface, the base 51 becomes too thick. Whereas if close too much to the specimen surface, there is no space for disposing an auxiliary member such as a filter etc between the specimen and the condenser, resulting in a poor usability. Then, according to the first embodiment, in terms of obviating this drawback, the condensers 8, 9 are designed to satisfy the following conditions:

$$-0.1<(1/|fL|)-(1/|dL|)<0.1$$

$$-0.1<(1/|fH|)-(1/|dH|)<0.1$$

These conditions are drawn out by adding, to the formula of the lens, a condition on which a distance between the upper surface of each of the condenser lenses 8, 9 and the surface of the specimen is larger than 7 mm but smaller than 30 mm. The condition of being larger than 7 mm but smaller than 30 mm is a range of realistic values with which the filter can be inserted above the condenser lenses 8, 9 and, besides, the apparatus does not become too thick. More preferably, it is desirable that upper and lower limit values fall within the following range:

$$-0.05<(1/|fL|)-(1/|dL|)<0.02$$

$$-0.1<(1/|fH|)-(1/|dH|)<0.016$$

Moreover, the high-magnification objective lens used in the first embodiment has a large aperture angle to such an extent that a numerical aperture of the single eye is 0.2 which is, if converted into an angle $\beta$, expressed such as $\beta=11.5°$ in FIG. 4(A), an angle $\alpha$ made by the light axes 70 of the two eyes is given such as $\alpha=24°$, and a total aperture angle $\theta$ is given by $\theta=11.5°$. It is therefore desirable for making the illumination light incident upon the high-magnification objective lens with no futility that the condenser lens 9 be designed to converge the light beam at an aperture angle $\theta c$ larger than the above aperture angle $\theta$ in addition to the variety of conditions given above.

The following is one example of specific lens data of the condenser lens 9 for the high-magnification objective lens, which is designed to satisfy the variety of conditions in the first embodiment.

| Condenser Lens 9 Surface | r | d | nd | vd |
|---|---|---|---|---|
| Specimen Surface | 0.0 | 19.9 | 1.0 | |
| First Surface | 75.0 | 7.5 | 1.56883 | 56.0 |
| Second Surface | −75.0 | 18.5 | 1.0 | |
| Shielded Surface | | | | |
| Focal Length = 64.1 | | | | | where r is a radius of curvature of the lens surface, d is a spacing between the lens surfaces, nd is a refractive index of d-line of a glass material, and vd is an Abbe's number of d-line of the glass material.

Note that the transparent specimen setting board 60 exists between the specimen surface and the first surface, however, this is converted into air in the lens data given above.

Further, the low-magnification objective lens in the first embodiment has a very broad actual visual field, and the entrance pupil of the objective lens normally exists closer to the side of the objective lens than the specimen. Therefore, the condenser lens 8 is designed to have, in addition to the conditions described already, a larger diameter than the actual visual field required, and a function of projecting the image of the light source 1 disposed in the vicinity of the deflection mirror 7 on the entrance pupil of the objective lens.

The following is one example of specific lens data of the condenser lens 8 for the low-magnification objective lens, which is designed to satisfy the variety of conditions in the first embodiment.

| Condenser Lens 8 Surface | r | d | nd | vd |
| --- | --- | --- | --- | --- |
| Specimen Surface | 0.0 | 9.9 | 1.0 | |
| First Surface | 410.0 | 7.0 | 1.796681 | 45.4 |
| Second Surface | −54.0 | 0.3 | 1.0 | |
| Third Surface | 54.0 | 7.0 | 1.796681 | 45.4 |
| Fourth Surface | −410.0 | 21.7 | 1.0 | |
| Shielded Surface | | | | |
| Focal Length = 30.5 | | | | |

In the case of the lens data of the condenser lenses 8, 9, fH=64.1, dH=18.5, fL=30.5, and dL=21.7. Therefore:

(fH/dH)/(fL/dL)=2.5, and the following condition is met:

$$0.5<(fH/dH)/(fL/dL)<6.0$$

Next, functions of the respective components when observing the specimen by the stereomicroscope in the first embodiment, will be explained.

The high-magnification objective lens or the low-magnification objective lens is fitted as the objective lens 61. When the high-magnification objective lens is fitted, the condenser lens 9 is disposed on the optical axis 70 by sliding the lever 10. When the low-magnification objective lens is fitted, the condenser lens 8 is disposed on the optical axis 70. Next, the specimen is placed on the specimen setting board 60, and the light source 1 is supplied with an electric current from a power source 52. The light emitted from the light source 1 forms an image in the vicinity of the reflecting surface of the deflection mirror 7 through the collector lens 2 and the field lens 6, and is deflected upwards. The condenser lens 8 or 9 converges the light beam and illuminates the specimen with the converged light beam. The light beam transmitting the specimen forms an image in enlargement through the objective lens 61, the zoom lens unit and an image forming lens unit. The movable lens of the zoom lens unit is zoomed by rotating the knob 56, whereby the magnification can be consecutively changed. The image of the transmitted light is observed via the eyepieces 54. The image of the light transmitting the specimen can be thereby observed. At this time, the condenser lens 9 converges the light beam at the angle larger than by the high-magnification object lens having the large aperture angle, and it is therefore feasible to permit the illumination light to enter the objective lens efficiently and to obtain a bright image of the transmitted light.

Further, in the case of performing the oblique illumination, the cover member 11 is fed out of the take-up mechanism 75 by rotating the unillustrated dial, thereby cutting off a portion of the light beam. At this time, as described above, the condensers 8, 9 form the entrance pupil of the objective lens 61 in the vicinity of the deflection mirror 7. Besides, even when the zoom lens unit is zoomed, the deflection mirror exists in the position of the entrance pupil of the objective lens 61 or within the focal depth of the entrance pupil thereof. Hence, the light can be cut off in the position of the entrance pupil within the broad magnification range. Accordingly, the bright and uniform oblique illumination can be conducted.

In this case, light shielding is fulfilled by covering the reflecting surface of the deflection mirror 7 with the cover member 11, and the function of the deflection mirror 7 and the light shielding are attained by the same reflecting surface. Accordingly, there is no necessity of disposing the light shielding plate in a different position from the deflection mirror 7, and the base 51 can be downsized. Further, the cover member 11 is wound by the take-up mechanism 75 provided at the rear surface of the deflection mirror 7, and hence it is unnecessary for increasing the thickness of the base 51 in order to secure a space for feeding out and taking up the cover member 11. The small-sized transmission illumination apparatus that enables the thin type base 51 to be disposed can be thereby obtained.

Further, the contrivance is that the reflectance gradually decreases stepwise from the front end side at the front end of the cover member 11, and it is therefore possible to prevent a phenomenon in which glaring occurs due to the diffracted light spreading inside at the edge of the specimen image with a larger difference in contrast. The sharp oblique illumination image can be thereby obtained.

Moreover, in the first embodiment, only the condenser lenses 8, 9 are required to be moved corresponding to the exchange of the objective lens 61, and there is no necessity of moving the light shielding member. Hence, the operation is simple, and the operability can be enhanced. Furthermore, the structure is simple enough not to require a large number of movable components, whereby the apparatus can be manufactured at a low cost.

Further, in the first embodiment, the light shielding is performed by the light shielding function of the same deflection mirror 7, and therefore an advantage is obtained wherein, even when the magnification changes, the oblique illumination can be obtained with a high reproducibility, and the specimen is easy to observe.

Figure 3:
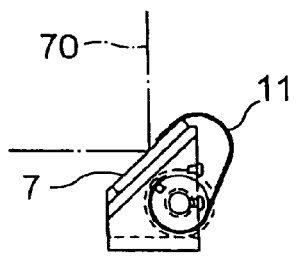
FIG. 3 is a side view showing another example of a configuration of a deflection mirror used in the illumination apparatus of the stereomicroscope in the first embodiment of the present invention.

Note that the deflection mirror 7 in the first embodiment takes the structure that the take-up mechanism 75 feeds out the cover member 11 from the lower side of the reflecting surface towards the upper side, and may also take such a structure that the cover member 11 is, as shown in FIG. 3, fed out from the upper side towards the lower side.

(Second Embodiment)

What is characteristic of the stereomicroscope in a second embodiment is that when the high-magnification objective lens is fitted, the condenser lens is not disposed between the specimen and the deflection mirror, and, only when the low-magnification objective lens is fitted, a condenser lens 24 is disposed on the optical axis 70. The condenser lens 24 is mounted on the same slide mechanism 74 as in the first embodiment and is set on and off the optical axis 70 by sliding the lever 10. Further, in the stereomicroscope in the second embodiment, the deflection mirror 23 does not incorporate the light shielding function, and a stretchable light shielding plate 21 is disposed between the deflection mirror 23 and the field lens 27. Configurations other than this are the same as those in the stereomicroscope in the first embodiment, and the repetitive explanations thereof are omitted.

In the second embodiment, the following is the reason why it is taken such a structure that the condenser lens is not disposed between the specimen and the deflection mirror when the high-magnification objective lens is fitted. As explained in the first embodiment, the entrance pupil of the high-magnification objective lens exists closer to the light source than the specimen surface and, even when the condenser lens is not provided, exists in the vicinity of the deflection mirror 23. Hence, the field lens 27 is designed so as to form an image of the light source 1 in the position of the entrance pupil of the high-magnification objective lens, whereby the image can be projected on the entrance pupil of the high-magnification objective lens even if no condenser lens is provided. Further, an aperture angle of the image of the light source 1 is determined by F-number of the field lens, and hence, if the aperture angle is set large by decreasing a focal length of the field lens, the aperture angle of the image of the light source 1 can be set equal to or greater than the aperture angle of the high-magnification objective lens even when there is not the condenser lens. Accordingly, the second embodiment takes an option that the condenser lens is not used when fitting the high-magnification objective lens by designing the field lens 27 in the way described above.

By contrast, when the low-magnification objective lens is fitted, as explained in the first embodiment, since the entrance pupil of the low-magnification objective lens exists closer to the objective lens than the specimen surface, so that the image of the light source 1 can be projected on the position of the entrance pupil without the condenser lens 24. Then, the optical characteristics of the condenser lens 24 are designed so that the position conjugate to the entrance pupil of the low-magnification objective lens is set in an image forming position of the field lens 27.

With this design, in both of the case where the high-magnification objective lens is attached and the case where the low-magnification objective lens is fitted, the entrance pupil of the objective lens or the position conjugate to this entrance pupil can be set coincident with the image forming position of the field lens 27. Note that the entrance pupil of the objective lens moves with zooming of the zoom lens unit as described in the first embodiment, and hence the condenser lens 24 and the field lens 27 are designed to make the entrance pupil of the objective lens or the position conjugate thereto coincident with the image forming position of the field lens 27 when at a low zoom magnification with a small focal depth of the entrance pupil. The focal depth of the entrance pupil is large when at a high zoom magnification, and therefore a contrivance is that the focal depth allows a positional deviation of the entrance pupil.

To be more specific, the condenser lens 24 is designed to satisfy the following conditions in order to make the position of the entrance pupil of the low-magnification objective lens coincident with the position of the entrance pupil of the high-magnification objective lens. These conditions are:

0.5<(fL/dL)<4.0

0.5<(dS/fL)<4.0 where dS is a distance along the optical axis 70 from the specimen surface to the light shielding plate 21.

Further, the stretchable light shielding plate 21 disposed at the entrance pupil of each of the high-magnification objective lens and the low magnification objective lens or in the position conjugate thereto, includes a plurality of rectangular light shielding filers 81, 82, 83 etc, a support frame 20 for supporting both of side ends thereof, a take-up mechanism 84 and a dial 22 for rotating the take-up mechanism 84. Each of the light shielding filters 81 etc is formed with holes 85 at both side ends thereof. A tread is led through these holes, and the tread and the holes are fixed. When rotating the dial 22, the take-up mechanism 84 winds the thread to draw out the rectangular light shielding filters 81, 82, 83 etc, and these light shielding filters are thus disposed in the light beams, thereby cutting off the light beams. The light shielding filters 81, 82, 83 etc contract or stretch corresponding to a thread winding quantity of the take-up mechanism 84, thereby making it possible to consecutively adjust a quantity of the light beams to be cut off. An angle of the oblique illumination can be thereby adjusted, and the dark field illumination can be also attained.

Thus, the light shielding plate 21 is constructed as the stretchable type in the second embodiment, whereby the light shielding filters 81, 82, 83 etc are disposed in superposition on a bottom surface when in a state where the light shielding filters 81, 82, 83 etc are moved completely off the light beams. This disposition requires almost no space for accommodation. Hence, the base 51 is not required to be constructed thick for moving the light shielding filters 81, 82, 83 etc off the light beams.

Further, among the light shielding filters 81, 82, 83 etc to be used, a transmittance of the light shielding filter 81 provided at the most front side end is 50%, the transmittance of the second light shielding filter 82 is 30%, and the transmittance of each of the third and other subsequent filters 83 etc is 0%. Thus, the light shielding rate is set low at the front side end of the light shielding member and set higher towards more inside the light shielding member. This contrivance make it feasible to prevent the phenomenon in which glaring occurs due to the diffracted light spreading inside at the edge of the specimen image with a larger difference in contrast, and to obtain the sharp specimen image. Note that the transmittance is not necessarily set at the three stages as described above, and the same effects can be obtained on condition that the transmittance is decreased at leastwise two stages.

The specific lens data of the condenser lens 24 used in the second embodiment are shown herein.

| Condenser Lens 24 Surface | r | d | nd |
|---|---|---|---|
| Specimen Surface | 0.0 | 9.9 | 1.0 |
| First Surface | 34.4 | 8.0 | 1.49108 |
| Second Surface | −139.0 | 44.0 | 1.0 |
| Shielded Surface | | | |

The first surface's aspherical surface count K=1.0. C2=0, C4=−2.59440×10$^{-6}$, C6=−1.73710×10$^{-9}$, C8=−6.8898×10$^{-13}$, C10=−8.60320×10$^{-16}$ Focal length=57

The lens data of this condenser lens 24 are fL=57, dL=44, dS=61.9, and hence (fL/dL)=1.3, (dS/fL)=1.1. The condenser lens 24 therefore satisfies the following conditions:

0.5<(fL/dL)<4.0

0.5<(dS/dL)<4.0

The stereomicroscope in the second embodiment takes the configuration having a less number of condenser lenses by one than in the first embodiment, and is nevertheless capable of making the position of the pupil of each of the objectives lens having the low through high magnifications substantially coincident with the position of the light shielding plate 21. Hence, the oblique illumination can be performed uniformly over the actual visual field at from the high magnification down to the low magnification.

Note that the distance between the specimen setting board 60 and the deflection mirror 23 is reduced for thinning the base 51, and therefore the entrance pupil of the high-magnification objective lens is positioned closer to the light source 1 than the deflection mirror 23 in the stereomicroscope in the second embodiment. For this reason, the stretchable light shielding plate 21 is used. Depending on some of the high-magnification objective lenses, however, the position of the entrance pupil becomes different, so that the position of the entrance pupil may be set at the reflecting surface of the deflection mirror 23. In this case, the deflection mirror 7 with the light shielding function in the first embodiment may be used as the deflection mirror 23.

As discussed above, according to the second embodiment of the present invention, the stereomicroscope capable of observing the specimen by the oblique illumination with a stability in the broad range of the magnification from high to low can be provided with the simple configuration.

Note that the mode of selecting one of the plurality of low-magnification objective lenses and the plurality of high-magnification objective lenses, has been described in the respective embodiments discussed above, however, what will hereinafter be explained is a method of how the objective lenses of actual products are classified into the low-magnification objective lenses and the high-magnification objective lenses. There are plural types of objective lenses of the actual products, i.e., from the 0.3-powered lens up to the 2-powered lens. As explained before, the objective lenses may be classified into two groups of the low-magnification objective lenses and the high-magnification objective lenses on the basis of the angle of 20 degrees made by the right and left light axes. When classifying the objective lenses into the two groups, the in-group objective lenses are similar to each other in terms of tendency of the position of the pupil and fluctuations thereof, and hence a substantially suited bright field and the oblique illumination can be attained.

It is effective that the stereomicroscope according to the invention of the present application has the following characteristics in order to carry out more preferred embodiments of the present invention.

Namely, it is preferable in the stereomicroscope according to the present invention, the fitting member is capable of selecting and fitting, as an objective lens, one of a predetermined low-magnification objective lens and a higher-magnification objective lens than this low-magnification objective lens. The illumination unit may include a first and second condenser lenses for converging the light beam passing the shield element on the specimen, and a mechanism for selecting one of the first and second condenser lenses and disposing the selected condenser lens on the optical axis of the objective lens. The first condenser lens exhibits an optical characteristic of setting, if at least the zoom lens has the lowest magnification, the position conjugate to the entrance pupil of the low-magnification objective lens fitted to the fitting member in a position of the shield element. The second condenser lens may exhibit an optical characteristic of setting, if at least the zoom lens has the lowest magnification, the position conjugate to the entrance pupil of the high-magnification objective lens fitted to the fitting member in a position of the shield element.

Further, it is preferable in the stereomicroscope according to the present invention, the fitting member is capable of selecting and fitting, as an objective lens, one of a predetermined low-magnification objective lens and a higher-magnification objective lens than this low-magnification objective lens. The illumination unit may include a first condenser lens for converging the light beam transmitting the shield element on the specimen, and a mechanism for moving the first condenser lens on and off the optical axis. The position where the shield element is disposed is a position of the entrance pupil of the high-magnification objective lens fitted to the fitting member if at least the zoom lens has the lowest magnification. The first condenser lens exhibits an optical characteristic of setting, if at least the zoom lens has the lowest magnification, the position conjugate to the entrance pupil of the low-magnification objective lens fitted to the fitting member in a position of the shield element.

Further, in the stereomicroscope according to the present invention, the first and second condenser lenses may be constructed to exhibit an optical characteristic that satisfies the following condition:

$$0.5<(fH/dH)/(fL/dL)<6.0$$

where fL is a synthetic focal length of the first condenser lens, fH is a synthetic focal length of the second condenser lens, dL is a distance along the optical axis from the center of the lens surface, closest to the shield element, of the first condenser lens to the shield element, and dH is a distance along the optical axis from the center of the lens surface, closest to the shield element, of the second condenser lens to the shield element.

With this configuration taken, the condition for making substantially the entrance pupils of the low- and high-magnification objective lenses coincident with each other, can be specifically given, and it is feasible to provide the stereomicroscope capable observing the specimen by the oblique illumination with the stability in the broad range of the magnification from high to low.

In the stereomicroscope according to the present invention, the first and second condenser lenses may be constructed to have optical characteristics that meet the following two conditions:

$$-0.1<(1/|fL|)-(1/|dL|)<0.1$$

$$-0.1<(1/|fH|)-(1/|dH|)<0.1$$

Further, in the stereomicroscope according to the present invention, the first condenser lens may be constructed to have an optical characteristic that meets the following conditions:

$$-0.1<(1/|fL|)-(1/|dL|)<0.1$$

$$0.5<(dS/fL)<4.0$$

where fL is a synthetic focal length of the first condenser lens, dL is a distance along the optical axis from the center of the lens surface, closest to the shield element, of the first condenser lens to the shield element, and dS is a distance along the optical axis from the specimen surface on the specimen setting board to the shield element.

With this configuration taken, it is possible to provide the stereomicroscope capable of setting the distance between the first (and second) condenser lens and the specimen setting board in a proper range.

Moreover, in the stereomicroscope according to the present invention, the light shield member may be constructed so that a transmittance at the front end is larger than transmittances of other portions.

Such a configuration being taken, it is feasible to provide the stereomicroscope capable of preventing an occurrence of glaring at the edge along the periphery of the specimen image due to the diffracted light spreading inside when performing the oblique illumination.

Further, the configuration shown in the above embodiments may be applied to not only the case of its being used as the stereomicroscope but also a case where the transmission illumination apparatus is attached to other stereomicroscope. In this case, the transmission illumination apparatus is constructed as a transmission illumination apparatus of the stereomicroscope capable of selecting and fitting, as an objective lens, one of a predetermined low-magnification objective lens and a higher-magnification objective lens than this low-magnification objective lens. The transmission illumination apparatus includes the light source, the shield element for cutting off partially the light beam emitted form the light source, the first and second condenser lenses for converging the light beam passing the shield element on the specimen, and the mechanism for selecting one of the first and second condenser lenses and disposing the selected lens on the optical axis. The first condenser lens exhibits an optical characteristic of setting, if the low-magnification objective lens is fitted, a position conjugate to the entrance pupil of the low-magnification objective lens in a position of the shield element. The second condenser lens exhibits an optical characteristic of setting, if the high-magnification objective lens is fitted, a position conjugate to the entrance pupil of the high-magnification objective lens in the position of the shield element.

Further, the transmission illumination apparatus of the stereomicroscope capable of selecting and fitting, as an objective lens, one of a predetermined low-magnification objective lens and a higher-magnification objective lens than this low-magnification objective lens, may include the light source, the shield element for cutting off partially the light beams emitted form the light source, the first condenser lens for converging the light beam passing the shield element on the specimen, and the mechanism for moving the first condenser lens on and off the optical axis. The shield element is disposed in the position of the entrance pupil of the high-magnification objective lens when the high-magnification objective lens is fitted to the fitting member. The first condenser lens exhibits the optical characteristic of setting the position conjugate to the entrance pupil of the low-magnification objective lens fitted to the fitting member in the position of the shield element.

Moreover, the transmission illumination apparatus of the stereomicroscope having a zoom lens for changing a magnification and an objective lens and capable of selecting and fitting, as an objective lens, one of a predetermined low-magnification objective lens and a higher-magnification objective lens than this low-magnification objective lens, may include the light source, the shield element for cutting off some of the light beam emitted from the light source. The shield element is disposed in a position conjugate to the entrance pupil of the objective lens when the zoom lens has the lowest magnification.

Each of those transmission illumination apparatuses is capable of performing the oblique illumination with a stability in the broad range of the magnification from high to low with the simple configuration.

According to a preferred mode of the present invention, it is feasible to provide the stereomicroscope capable of forming the image of the light source at the entrance pupil of the objective lens or in the position conjugate to the entrance pupil thereof, and therefore performing the bright and uniform transmission illumination.

According to another preferred mode of the present invention, the reflecting element and the shield element can be disposed in the same position, whereby the small-sized stereomicroscope can be provided.

According to a further preferred mode of the present invention, the optical axis is bent between the shield element and the first and second condenser lenses, and therefore the stereomicroscope capable of attaining a thin illumination unit can be provided.

According to a still further preferred mode of the present invention, because of the shield element being constructed as a stretchable type, the space for accommodating the shield element can be reduced, and the stereomicroscope capable of attaining the thin illumination unit can be provided.

According to a yet further preferred mode of the present invention, the illumination light can enter the objective lens at a high efficiency corresponding to the aperture angle of the objective lens, and therefore the stereomicroscope capable of obtaining a bright image can be provided.

According to a furthermore preferred mode of the present invention, it is possible to provide the stereomicroscope capable of preventing an occurrence of glaring at the edge along the periphery of the specimen image due to the diffracted light spreading inside when performing the oblique illumination.

What is claimed is:

1. A stereomicroscope comprising:

an illumination unit for illuminating a specimen with light;

a specimen setting board; and a fitting member for fitting an objective lens, said illumination unit, said specimen setting board and said fitting member being disposed in sequence on an optical axis, wherein one of a predetermined a low-magnification objective lens and a higher-magnification objective lens than said low-magnification objective lens is selected and fitted as said objective lens to said fitting member, said illumination unit includes a light source, a shield element for cutting off partially light beam emitted from said light source, first and second condenser lenses for converging the light beam passing said shield element on the specimen, and a mechanism for selecting one of said first and second condenser lenses and disposing said selected condenser lens on the optical axis, said first condenser lens exhibits an optical characteristic of setting a position conjugate to an entrance pupil of said low-magnification objective lens fitted to said fitting member in a position of said shield element or in the vicinity of said shield element, said second condenser lens exhibits an optical characteristic of setting a position conjugate to an entrance pupil of said high-magnification objective lens fitted to said fitting member in a position of said shield element or in the vicinity of said shield element, wherein said shield element is disposed on a deflecting element for bending the optical axis, wherein said shield element has a cover member for covering a part of a deflecting surface of said deflecting element, and wherein said shield element includes a mechanism for increasing and decreasing a covered area of the deflecting surface by feeding out and drawing in said cover member above the deflecting surface in order to adjust a quantity of the light beam to be cut off.

2. A stereomicroscope comprising:

an illumination unit for illuminating a specimen with light;

a specimen setting board: and a fitting member for fitting an objective lens, said illumination unit, said specimen setting board and said fitting member being disposed in sequence on an optical axis, wherein one of a predetermined a low-magnification objective lens and a higher-magnification objective lens than said low-magnification objective lens is selected and fitted as said objective lens to said fitting member, said illumination unit includes a light source, a shield element for cutting off partially light beam emitted from said light source, first and second condenser lenses for converging the light beam passing said shield element on the specimen, and a mechanism for selecting one of said first and second condenser lenses and disposing said selected condenser lens on the optical axis, said first condenser lens exhibits an optical characteristic of setting a position conjugate to an entrance pupil of said low-magnification objective lens fitted to said fitting member in a position of said shield element or in the vicinity of said shield element, said second condenser lens exhibits an optical characteristic of setting a position conjugate to an entrance pupil of said high-magnification objective lens fitted to said fitting member in a position of said shield element or in the vicinity of said shield element, wherein said shield element is disposed on a deflecting element for bending the optical axis, wherein said shield element has a cover member for covering a part of a deflecting surface of said deflecting element, and wherein a reflectance of a front end portion of said cover member is larger than reflectances of other portions thereof.

3. A stereomicroscope according to claim 2, wherein the reflectance of said shield element decreases continuously from a tip end thereof toward an inner portion thereof.

4. A stereomicroscope according to claim 2, wherein the reflectance of said shield element decreases stepwisely from a tip end thereof toward an inner portion thereof.

5. A stereomicroscope comprising:

an illumination unit for illuminating a specimen with light;

a specimen setting board; and a fitting member for fitting an objective lens, said illumination unit, said specimen setting board and said fitting member being disposed in sequence on an optical axis, wherein one of a predetermined a low-magnification objective lens and a higher-magnification objective lens than said low-magnification objective lens is selected and fitted as said objective lens to said fitting member, said illumination unit includes a light source, a shield element for cutting off partially light beam emitted from said light source, first and second condenser lenses for converging the light beam passing said shield element on the specimen, and a mechanism for selecting one of said first and second condenser lenses and disposing said selected condenser lens on the optical axis, said first condenser lens exhibits an optical characteristic of setting a position conjugate to an entrance pupil of said low-magnification objective lens fitted to said fitting member in a position of said shield element or in the vicinity of said shield element, said second condenser lens exhibits an optical characteristic of setting a position conjugate to an entrance pupil of said high-magnification objective lens fitted to said fitting member in a position of said shield element or in the vicinity of said shield element, wherein the position conjugate to the entrance pupil of said low-magnification objective lens formed by said first condenser lens and the position conjugate to the entrance pupil of said higher-magnification objective lens formed by said second condenser lens are substantially same, wherein the shield element is disposed at a position distant from the first condenser lens and the second condenser lens, and at a side of the light source, and wherein the following conditions are satisfied:

$$0.5 < (fH/dH)/(CL/dL) < 6.0$$

$$-0.1 < (1/|fL|) - (1/|dL|) < 0.1$$

$$-0.1 < (1/|fH|) - (1/|dH|) < 0.1$$

where fH is a synthetic focal length of the condenser lens for the high-magnification objective lens, fL is a synthetic focal length of the condenser lens for the low-magnification objective lens, dH is a distance along the optical axis from the center of the lens surface of the condenser lens for the high-magnification objective lens to a deflecting surface of a deflecting element disposed in the position of said shield element, and dL is a distance along the optical axis from the center of the lens surface of the condenser lens for the low-magnification objective lens to the deflecting surface of the deflecting element disposed in the position of said shield element.

6. A stereomicroscope comprising:

an illumination unit for illuminating a specimen with light;

a specimen setting board; and a fitting member for fitting an objective lens, said illumination unit, said specimen setting board and said fitting member being disposed in sequence on an optical axis, wherein one of a predetermined a low-magnification objective lens and a higher-magnification objective lens than said low-magnification objective lens is selected and fitted as said objective lens to said fitting member, said illumination unit includes a light source, a shield element for cutting off partially light beam emitted from said light source, a first condenser lens for conversing the light beam passing said shield element on the specimen, and a mechanism for moving said first condenser lens on and off the optical axis, said shield element is disposed in a position of an entrance pupil or in the vicinity of this entrance pupil of said high-magnification objective lens as said objective lens fitted to said fitting member, said first condenser lens exhibits an optical characteristic of setting a position conjugate to an entrance pupil of said low-magnification objective lens fitted to said fitting member in a position of said shield element or in the vicinity of said shield element, the shield element is disposed at a position distant from the first condenser lens, and at a side of the light source, and wherein the following conditions are satisfied:

$$0.5 < (fL/dL) < 4.0$$

$$0.5 < (dS/dL) < 4.0,$$

where fL is a synthetic focal length of the condenser lens for the low-magnification objective lens, dL is a distance along the optical axis from the center of the lens surface of the condenser lens for the low-magnification objective lens to a deflecting surface of a deflecting element disposed in the position of said shield element, and dS is a distance along the optical axis from the specimen surface on the specimen setting board to the shield element.

7. A stereomicroscope comprising:

an illumination unit for illuminating a specimen with light;

a specimen setting board; and a fitting member for fitting an objective lens, said illumination unit, said specimen setting board and said fitting member being disposed in sequence on an optical axis, wherein one of a predetermined a low-magnification objective lens and a higher-magnification objective lens than said low-magnification objective lens is selected and fitted as said objective lens to said fitting member, said illumination unit includes a light source, a shield element for cutting off partially light beam emitted from said light source, a first condenser lens for converging the light beam passing said shield element on the specimen, and a mechanism for moving said first condenser lens on and off the optical axis, said shield element is disposed in a position of an entrance pupil or in the vicinity of this entrance pupil of said high-magnification objective lens as said objective lens fitted to said fitting said first condenser lens exhibits an optical characteristic of setting a position conjugate to an entrance pupil of said low-magnification objective lens fitted to said fitting member in a position of said shield element or in the vicinity of said shield element, the shield element is disposed at a position distant from the first condenser lens, and at a side of the light source, and wherein a deflecting element for bending the optical axis is disposed in the position of said shield element of said illumination unit, said shield element has a cover member for covering a part of a deflecting surface of said deflecting element, wherein a reflectance of a front end portion of said cover member is larger than reflectances of other portions thereof.

8. A stereomicroscope comprising:

an illumination unit for illuminating a specimen with light;

a specimen setting board; and a fitting member for fitting an objective lens, said illumination unit, said specimen setting board and said fitting member being disposed in sequence on an optical axis, wherein one of a predetermined a low-magnification objective lens and a higher-magnification objective lens than said low-magnification objective lens is selected and fitted as said objective lens to said fitting member, said illumination unit includes a light source, a shield element for cutting off partially light beam emitted from said light source, first and second condenser lenses for converging the light beam passing said shield element on the specimen, and a mechanism for selecting one of said first and second condenser lenses and disposing said selected condenser lens on the optical axis, said first condenser lens exhibits an optical characteristic of setting a position conjugate to an entrance pupil of said low-magnification objective lens fitted to said fitting member in a position of said shield element or in the vicinity of said shield element, said second condenser lens exhibits an optical characteristic of setting a position conjugate to an entrance pupil of said high-magnification objective lens fitted to said fitting member in a position of said shield element or in the vicinity of said shield element, wherein said shield element is disposed on a deflecting element for bending the optical axis, wherein said shield element has a cover member for covering a part of a deflecting surface of said deflecting element, and wherein the following conditions are satisfied:

$$0.5 < (fH/dH)/(fL/dL) < 6.0$$

$$-0.1 < (1/|fL|) - (1/|dL|) < 0.1$$

$$-0.1 < (1/|fH|) - (1/|dH|) < 0.1,$$

where fH is a synthetic focal length of the condenser lens for the high-magnification objective lens, fL is a synthetic focal length of the condenser lens for the low-magnification objective lens, dH is a distance along the optical axis from the center of the lens surface of the condenser lens for the high-magnification objective lens to the deflecting surface of the deflecting element, and dL is a distance along the optical axis from the center of the lens surface of the condenser lens for the low-magnification objective lens to the deflecting surface of the deflecting element.

9. A stereomicroscope comprising:

an illumination unit for illuminating a specimen with light;

a specimen setting board; and a fitting member for fitting an objective lens, said illumination unit, said specimen setting board and said fitting member being disposed in sequence on an optical axis, wherein one of a predetermined a low-magnification objective lens and a higher-magnification objective lens than said low-magnification objective lens is selected and fitted as said objective lens to said fitting member, said illumination unit includes a light source, a shield element for cutting off partially light beam emitted from said light source, first and second condenser lenses for converging the light beam passing said shield element on the specimen, and a mechanism for selecting one of said first and second condenser lenses and disposing said selected condenser lens on the optical axis, said first condenser lens exhibits an optical characteristic of setting a position conjugate to an entrance pupil of said low-magnification objective lens fitted to said fitting member in a position of said shield element or in the vicinity of said shield element, said second condenser lens exhibits an optical characteristic of setting a position conjugate to an entrance pupil of said high-magnification objective lens fitted to said fitting member in a position of said shield element or in the vicinity of said shield element, wherein said shield element is disposed on a deflecting element for bending the optical axis, wherein said shield element has a cover member for covering a part of a deflecting surface of said deflecting element, and wherein the following conditions are satisfied:

$$0.5 < (fL/dL) < 4.0$$

$$0.5 < (dS/dL) < 4.0,$$

where fL is a synthetic focal length of the condenser lens for the low-magnification objective lens, dL is a distance along the optical axis from the center of the lens surface of the condenser lens for the low-magnification objective lens to the deflecting surface of the deflecting element, and dS is a distance along the optical axis from the specimen surface on the specimen setting board to the shield element.

* * * * *